United States Patent [19]

Pronk

[11] 4,154,619

[45] May 15, 1979

[54] SULPHUR-BITUMINOUS COMPOSITIONS

[75] Inventor: Frank E. Pronk, Calgary, Canada

[73] Assignee: Sulphur Development Institute of Canada (SUDIC), Calgary, Canada

[21] Appl. No.: 810,907

[22] Filed: Jun. 28, 1977

Related U.S. Application Data

[63] Continuation of Ser. No. 636,717, Dec. 1, 1975, abandoned.

[30] Foreign Application Priority Data

Dec. 3, 1974 [GB] United Kingdom ............... 52222/74

[51] Int. Cl.$^2$ .............................................. C08L 95/00
[52] U.S. Cl. .................................... 106/274; 106/275; 106/277; 106/281 R
[58] Field of Search ............... 106/274, 275, 277, 273, 106/281 R; 252/311.5

[56] References Cited

U.S. PATENT DOCUMENTS

| | | | |
|---|---|---|---|
| 2,182,837 | 12/1939 | Bacon et al. ............................. | 404/79 |
| 2,602,029 | 7/1952 | Bradshaw ............................. | 106/277 |
| 3,239,361 | 3/1966 | Speer .................................... | 106/275 |
| 3,738,853 | 6/1973 | Koprillem et al. ................... | 106/274 |
| 3,803,066 | 4/1974 | Petrossi ......................... | 260/285 AS |
| 3,970,468 | 7/1976 | Garrigues et al. ................... | 106/274 |
| 4,038,096 | 7/1977 | Graf et al. ............................. | 106/277 |

FOREIGN PATENT DOCUMENTS

| | | |
|---|---|---|
| 1444629 | 8/1965 | France ..................................... 106/274 |
| 2293525 | 12/1974 | France. |
| 1076866 | 7/1967 | United Kingdom. |
| 1303318 | 1/1973 | United Kingdom. |

OTHER PUBLICATIONS

Chem. Abstract 70:21658f.

*Primary Examiner*—Lorenzo B. Hayes
*Attorney, Agent, or Firm*—Schwartz, Jeffery, Schwaab, Mack, Blumenthal & Koch

[57] ABSTRACT

A small amount of an organosiloxane polymer stabilizes an emulsion of sulphur and a bituminous material in which the bituminous material is a continuous phase and the sulphur is a dispersed phase; the stabilized emulsion serves as a binder for mineral aggregates in the manufacture of paving mixtures.

23 Claims, No Drawings

SULPHUR-BITUMINOUS COMPOSITIONS

This is a continuation of application Ser. No. 636,717, filed Dec. 1, 1975, now abandoned.

BACKGROUND OF THE INVENTION

1. Field of the Invention

The invention relates to a stabilized binding composition for mineral aggregates in the manufacture of paving mixtures, and its preparation; the invention is further concerned with paving compositions and their preparation; more especially the invention is concerned with compositions comprising emulsions of sulphur in bituminous materials for use as a binder for mineral aggregates in the manufacture of paving mixtures.

2. Description of the Prior Art

Compositions comprising sulphur emulsified in asphalt have been proposed as binders in paving compositions in U.S. Pat. No. 2,182,837, however, such binders have not been used to any great extent. These prior binders are of low stability and it is necessary to use them without delay in making paving compositions; this necessitates manufacturing the binder at the paving plant site; and this in turn requires the use of two mixers, a high shear mixer such as a colloid mill to form an emulsion of sulphur in asphalt, and a pugmill to mix the mineral aggregates and the emulsion.

In view of the difficulties experienced when using asphalt-sulphur compositions and, until recently, the ready availability of asphalt at low cost, the industry has favoured the use of asphalt alone as a binder for aggregates in paving compositions.

SUMMARY OF THE INVENTION

It is an object of the invention to provide an improved binder composition having greater stability than the aforementioned prior binder compositions; in which the now readily available sulphur is employed in an emulsion with bituminous material thus reducing the quantity of the more expensive bituminous material employed in the paving mixture. In addition, the invention provides a simple procedure for manufacturing such emulsions.

It is a further object of the invention to provide a method of manufacturing a paving composition which avoids the necessity of a preliminary mixing operation to form a sulphur-bituminous emulsion.

It has now been found that a small amount of an organosiloxane polymer will stabilize an emulsion of sulphur and bituminous material.

According to the invention there is provided a stabilized binder composition for mineral aggregates in the manufacture of paving mixtures comprisng an emulsion of sulphur and a bituminous material and an emulsion stabilizing amount of an organosiloxane polymer; in which said bituminous material is a continuous phase and said sulphur is a dispersed phase.

According to another aspect of the invention there is provided a method of preparing a stabilized binder composition for mineral aggregates in the manufacture of paving mixtures which comprises mixing together at an elevated temperature bituminous material, molten sulphur and an emulsion stabilizing amount of a liquid oganosiloxane polymer to form an emulsion having a continuous phase of bituminous material and a dispersed phase of molten sulphur.

In another aspect of the invention there is provided a method of manufacturing a paving composition comprising mineral aggregates and the binder formulation of the invention, which comprises simultaneously mixing together, at an elevated temperature, bituminous material, sulphur, a stabilizing amount of an organosiloxane polymer and a major amount of a mineral aggregate.

In yet another aspect of the invention there is provided a paving composition and a paved surface formed from the paving composition.

DESCRIPTION OF THE PREFERRED EMBODIMENTS

In an embodiment of the invention a method is provided for the simple plugged flow blending of the bituminous material and sulphur just prior to the pugmill weigh bucket, in cases where it is desirous to simplify the paving plant modifications necessary, to enable the binder compositions of the invention to be used to prepare paving compositions, and also to maintain the paving plant capacity.

In the emulsions of the invention, the liquid sulphur forms a discontinuous phase or dispersed phase in the continuous liquid bituminous phase.

Although the inventors do not wish to be limited to any particular theory, it is thought that the stabilizing effect of the organosiloxane polymer on the sulphur-bituminous emulsion arises from the formation of an insoluble monolayer of the polymer at the liquid interface of the sulphur and bituminous material; the monolayer resulting in a significant reduction in the sedimentation rate of liquid sulphur particles during storage.

A further stabilizing of the sulphur-bituminous emulsion may be due to the formation of a mechanical barrier of the polymer at the sulphur bituminous interface preventing coalescence of the liquid sulphur particles.

In addition the emission of sulphur gases from the binder is reduced when the polymer is present in the mixture.

Suitably the emulsion binder composition contains about 40% by weight of sulphur and about 60% by weight of bituminous material. Preferably the sulphur content should not be less than 20% and not exceed about 50% by weight of the binder and more preferably should be from about 30 to 40% of the binder. Generally the ratio of sulphur to bituminous material in the emulsion will not exceed 1:1 and is preferably within the range 43:100 to 67:100.

The paving mixture suitably contains from about 85% to 95% by weight of mineral aggregate and 5% to 15% by weight of the binder composition; it will be appreciated that the preferred amounts of the ingredients of the paving mixture composition will be governed by aggregate type and gradation in any particular case.

The organosiloxane polymer is employed in an amount effective to stabilize the emulsion of sulphur in bituminous material. This amount should be effective to prevent any significant sedimentation of liquid sulphur from the emulsion when it is maintained at a temperature of 125° C. to 145° C. under gentle agitation.

Suitably the amount of organosiloxane polymer will not exceed 0.1%, by weight, based on the weight of bituminous material, and generally amounts of the order of 0.001%, by weight, produce the desired stabilization of the emulsion.

The bituminous materials employed in this invention are bitumen-containing mixtures such as occur in the native state and as a residue from petroleum distillation; a particularly preferred bituminous material is asphalt.

The asphalts employed in the invention should be fluid at the temperatures employed.

Asphalt has a penetration value for paving of from about 40 to 400, the penetration grade selected for a specific situation being governed largely by the climatic conditions experienced in the particular area to be paved.

The organosiloxane polymer is a liquid having the general formula

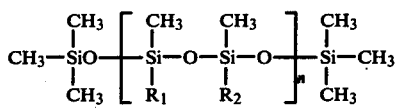

where n ranges from 0 to 1000 and $R_1$ and $R_2$ which may be the same or different are selected from the group consisting of alkyl of 1 to 6 carbon atoms, phenyl, benzyl, phenoxy and halo-alkyl of 1 to 6 carbon atoms, for example, $CH_3$, $C_6H_5$, or $C_3F_3H_4$. The preferred polymers are fluid polydimethyl siloxanes having the general formula

where n ranges from 0 to 2000 and particularly suitable are such siloxanes having a viscosity in the range from about 50 to about 40,000 centistokes, preferably 300 to 12,500 and most preferably of the order of 1000 centistokes at 25° C.

As the mineral aggregate, there may be employed any of the aggregates conventionally used in bituminous paving mixtures, as well as synthetic aggregates. Other aggregates considered marginal for conventional paving aggregates may also be used.

The binder compositions of the invention may be prepared by emulsifying the components, the bituminous material being in a fluid or liquid state and the sulphur being in a molten state, in the preferred amounts described above, in a mixer; the organosiloxane polymer and bituminous material are suitably pre-mixed in a suitable fashion. Any type of conventional mixer for producing emulsions may be used, for example, a colloid mill. However, the emulsion is readily generated enabling simpler mixing devices to be used. The preferred mixer is a stainless steel Kenics™ Static Mixer which is a simple in-line mixer having no moving parts, mixing being achieved by simultaneous flow division and radial mixing. The mixing temperature should be in the range where sulphur is in a molten, pumpable state and consequently should be above the melting point of sulphur, about 118°–119° C.; the upper mixing limit is about 159° C.; above this temperature the sulphur viscosity increases rapidly by several orders of magnitude and it can no longer be pumped. The preferred mixing temperature is in the range 130° C. to 150° C.

To store the emulsion, it is transferred to a thermostatically controlled vessel maintained at 125° C. to 145° C., where the emulsion is subjected to continuous gentle agitation by for example slowly rotating low pitch propellers or a circulating pump. The emulsion can be stored under these conditions, ready for use as the binder in the formation of a paving composition.

Alternatively, the separate components of the binder composition can be introduced directly and simultaneously into a mixer with the mineral aggregate; and mixed under the conditions indicated above for the emulsion formation; in this case a pugmill is particularly suitable as the mixer.

In order to minimize the modifications of existing paving plants and maintain the plants' normal production capacity, it will generally be desirable to join the molten sulphur stream and that comprising the bituminous material plus organosiloxane polymer just prior to the plant weigh bucket. This can be most effectively achieved, and the emulsion generated at the same time by joining the streams and passing them through a Kenics™ Static Mixer of suitable size upstream from the weigh bucket.

The size of the mixer is governed largely by the required fluid velocity of the sulphur/bituminous material composition through the mixer and is suitably in the range of about 1 to about 25 ft./sec., preferably of the order of 10 ft./sec.

The binder compositions of the invention are found to have improved storage characteristics as compared with the known sulphur-asphalt binders and exhibit reduced emissions of sulphur gases. Good binder characteristics were demonstrated when the paving compositions were evaluated according to the Marshall Mix Method ASTM D1559. The binder composition further showed good results in freeze-thaw and immersion compression tests performed to evaluate adhesive properties of the binder composition in comparison with conventional paving grade asphalt cement.

Aging studies indicate that sulphur/asphalt emulsion concretes of the invention exhibit increased durability compared to ordinary asphalt concretes. Computer pavement analyses using the CHEVSL program indicate that savings in asphalt concrete layer thickness, and hence savings in material costs, can be made using the sulphur/asphalt emulsion concretes of the invention.

Marshall stability tests on fresh sulphur-asphalt concretes of the invention show similar values as for comparable asphaltic concretes, however, on curing for a period of two weeks substantial increases are observed in the Marshall Stability of the sulphur asphalt emulsion concretes without an accompanying detrimental decrease in the Marshall Flow. No change in Marshall Stability with time is observed with regular asphaltic concretes.

A particularly important aspect of the binder compositions of the invention is that the sulphur exhibits "supercooling" i.e. remains liquid below its melting point. Thus paving mixes containing the sulphur asphalt emulsions as the binder retain their workability to lower temperatures than do those containing regular asphalt binders, with resultant advantages which will be apparent to one skilled in the art.

The invention is illustrated by reference to the following examples which are not to be construed as limiting.

EXAMPLE 1

The following ingredients were introduced to a total of 1800 gms into a mixer and emulsified at a temperature of 130° C. for 10 minutes.

| | |
|---|---|
| Liquid sulphur | 37.5% by weight |
| Liquid asphalt (Gulf AC500)™ | 62.5% by weight |

-continued

| Dow Corning 200 Fluid (trademark for a polydimethyl siloxane) | 0.001% (based on the weight of asphalt) |
|---|---|

A control was run without the silicone.

The mixer was a Cowles™ Dissolver, Model IVG with a Cowles™ Hi-Shear Impeller No. B-1530 (3 in. diameter) operating at a speed of 4400 rpm. The resulting emulsion was degassed to remove entrained air, and separate samples of the emulsion were stored at 130° C. with mild agitation (propeller rotating at 100-125 rpm). Density measurements were made at the top (T) and bottom (B) of three samples to determine whether or not settling was occurring and the results are shown in Table 1.

TABLE I

| Sample | ½ hr. T | ½ hr. B | 5 hr. T | 5 hr. B | 72 hr. T | 72 hr. B |
|---|---|---|---|---|---|---|
| Control | 1.19 | 1.18 | 1.05 | 1.80 | 1.05 | 1.80 |
| Dow Corning™ 200 | 1.19 | 1.19 | 1.10 | 1.21 | 1.15 | 1.20 |

The control emulsion had broken within 5 hrs. by sedimentation of sulphur as shown by the significant variation in density between the top of each sample and the bottom, whereas the composition of the invention was essentially unchanged after 72 hrs. of heated storage.

EXAMPLE 2

A molten sulphur stream and one containing asphalt (Gulf AC500™ pen 150 - 200) plus Dow Corning™ 200 Fluid (0.001% by weight of the asphalt) were combined and pumped through a Kenics™ Model ½-10-320-0 Static Mixer. This is a one-half inch diameter mixer containing six helical baffles. Fluid stream temperatures were maintained at 138° C. The linear velocity through the mixer was varied from 0.2 to 2.3 ft./sec. and the sulphur content varied between 15% and 85% by weight of the asphalt. Samples of the emulsion prepared in this way were examined for particle size distribution by a photomicrographic technique. In all cases the average particle size was less than 5 microns and the particle size distribution range was narrow.

EXAMPLE 3

Paving mixes were prepared by the simultaneous injections of liquid sulphur and asphalt cement containing Dow Corning™ 200 Fluid into a heated aggregate in a Hobart Laboratory Mixer. The mixing temperature was 138° C. and the mixing cycle was 60 seconds. The mix composition was as follows:

| Asphalt Cement (Gulf AC500™ penetration 150–200) | 4.5 | parts by weight |
|---|---|---|
| Liquid Sulphur | 3.0 | parts by weight |
| Dow Corning™ 200 Fluid | .001 | % by weight of the asphalt |
| Aggregate (well graded ⅜") | 92.5 | parts by weight |

A control mix containing 6.5 parts of asphalt and no sulphur was prepared and also a mix where the sulphur and asphalt had been pre-emulsified in a Kenics™ Static Mixer. The samples were evaluated using the Marshall Method. The asphalt control was compacted at 127° C. and 35 blows/face were applied whereas the emulsion samples were compacted at 121° C. and 30 blows/face. The results are shown in Table II.

TABLE II

| | Marshall Stability - lbs. | | Flow - 0.01 ins. | |
|---|---|---|---|---|
| Sample type | 24 hrs. after molding | 14 days after molding | 24 hrs. after molding | 14 days after molding |
| S.A. | 2050 | 3420 | 9.5 | 12.5 |
| S.A. pre-emulsified | 2690 | 4250 | 9.0 | 11.0 |
| Control | 2050 | 2050 | 12.0 | 12.0 |

S.A. denotes sulphur-asphalt emulsion of the invention.

The initial compaction temperature of 121° C. for the sulphur-asphalt samples ensures that the temperature of the sample will fall below the melting point of sulphur during compaction. If solidification of the sulphur occurs during compaction the samples will loose compactability and this will be reflected in lower densities and Marshall stabilities. The data in Table II indicates that freezing has not occurred during compaction. Although the sulphur asphalt sample which was not pre-emulsified had a somewhat lower Marshall stability compared to the pre-emulsified sample, the 24 hr. value was quite high and the characteristic increase in the Marshall Stability was observed over the 14 day period.

EXAMPLE 4

A paving mix was prepared using a 2000 lb. asphalt paving batch plant. The mix composition was as follows:

| Asphalt Cement (Gulf AC500™ 150–200 pen) | 4.53 | parts by weight |
|---|---|---|
| Sulphur | 2.67 | parts by weight |
| Dow Corning™ 200 Fluid | 0.001 | % by weight of the asphalt |
| Aggregate (well graded ½ inch) | 92.8 | parts by weight | trademark

The asphalt stream containing the organosiloxane polymer was combined with the molten sulphur stream and passed through a Kenics™, model KMOD-10 mixer. This is a 1½ inch diameter unit containing six helical elements or baffles. The asphalt and sulphur were maintained at 138° C. and the velocity through the mixer was 18 ft./sec. The sulphur-asphalt emulsion was metered into a pugmill containing the heated aggregate (149° C.) and the emulsion and aggregate were mixed for 30 seconds. Mix samples were subjected to evaluation by the Marshall Method ASTM D1559; the results are tabulated in Table III.

TABLE III

| Marshall Stability - lbs. | | Flow - 0.01 ins. | |
|---|---|---|---|
| 24 hrs. after molding | 14 days after molding | 24 hrs. after molding | 14 days after molding |
| 2530 | 2660 | 8 | 10 |
| 2320 | 3040 | 9.5 | 9.5 |

EXAMPLE 5

A durability study was aimed at establishing the change in stiffness of asphaltic concretes containing normal weight and lightweight aggregate filler and conventional and sulphur-asphalt emulsion binders.

Prior to placing the samples in the test environments the resilient modulus, $M_R$, and the density of each sample were determined. Samples were placed in a dry environment at each of two temperatures, 0° F. and 140° F., for a period of seven months. It has been shown that for ordinary asphaltic concrete, storage for seven months at 140° F. is equivalent to 5 to 7 years aging in terms of recovered asphalt viscosity. The second temperature of 0° F. was used to determine the $M_R$ changes for the low temperature service extreme for asphaltic concretes. The results are shown in Tables IV and V.

TABLE IV
RESULTS OF STORAGE AT 0° F.

| Sample Type | Original $M_R$ ($\times 10^5$ psi) | Final $M_R$ ($\times 10^5$ psi) | Final $M_R$ as % of Original |
|---|---|---|---|
| Emulsion A | 3.86 | 2.79 | 72.3 |
| Asphalt only A | 1.29 | 0.79 | 61.6 |
| Emulsion B | 3.90 | 3.49 | 89.4 |
| Asphalt only B | 1.13 | 0.66 | 58.2 |

A - denotes a normal weight aggregate
B - denotes a lightweight aggregate
Emulsion - denotes a binding formulation of the invention.

TABLE V
RESULTS OF STORAGE AT 140° F.

| Sample Type | Original $M_R$ ($\times 10^5$ psi) | Final $M_R$ ($\times 10^5$ psi) | Final $M_R$ as % of Original |
|---|---|---|---|
| Emulsion A | 3.72 | 4.19 | 112.7 |
| Asphalt only A | 1.26 | 4.66 | 370.7 |
| Emulsion B | 3.94 | 5.67 | 143.9 |
| Asphalt only B | 0.93 | 3.06 | 328.5 |

Consideration of Table IV shows that at 0° F. there is a reduction in the $M_R$ of all the specimens.

However, the sulphur-asphalt emulsion concrete specimens of the invention show a greater retention of strength compared to regular asphalt concretes.

At 140° F., Table V, it is clear that the increase in strength of the sulphur-asphalt emulsion concrete specimens is proportionately much less than that for the ordinary asphaltic concrete specimens.

This indicates less aging (hardening) of the sulphur-asphalt emulsion concretes and suggests better durability properties than their ordinary asphalt counterparts.

I claim:

1. In an improved stabilized binder composition for mineral aggregates in the manufacture of paving mixtures comprising an emulsion of sulphur and a bituminous material having a sulphur content of from 20 to 50%, by weight, and in which said bituminous material is a continuous phase and said sulphur is a dispersed phase, the improvement which comprises an emulsion stabilizing amount of an organosiloxane polymer not exceeding 0.1%, by weight, based on the weight of said bituminous material.

2. A composition according to claim 1 in which said polymer has the general formula:

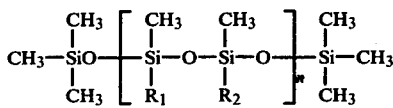

where n ranges from 0 to 1000 and $R_1$ and $R_2$ which may be the same or different are selected from the group consisting of alkyl of 1 to 6 carbon atoms, phenyl, phenoxy, benzyl and halo-alkyl of 1 to 6 carbon atoms.

3. A stabilized binder composition for mineral aggregates in the manufacture of paving mixtures comprising an emulsion of sulphur and a bituminous material comprising 60 to 70%, by weight, of said bituminous material and 30 to 40%, by weight, of said sulphur based on the weight of said composition, and not more than 0.1%, by weight, based on the weight of said bituminous material, of an emulsion stabilizing amount of an organosiloxane polymer of the general formula:

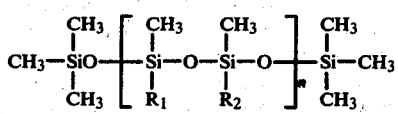

where n ranges from 0 to 1000 and $R_1$ and $R_2$ which may be the same or different are selected from the group consisting of alkyl of 1 to 6 carbon atoms, phenyl, phenoxy, benzyl, and halo-alkyl of 1 to 6 carbon atoms; in which said bituminous material is a continuous phase and said sulphur is a dispersed phase.

4. A composition according to claim 3 in which said polymer has the formula

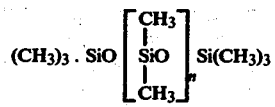

where n ranges from 0 to 2000 and is selected such that the polymer has a viscosity of about 300 to 12,500 centistokes at 25° C.

5. A composition according to claim 4 wherein said bituminous material is asphalt and said polymer is present in a stabilizing amount of about 0.001%, by weight, based on the weight of asphalt.

6. A paving mix suitable for forming a paved surface comprising from about 85% to 95%, by weight, of mineral aggregate and from 5% to 15%, by weight, of the improved stabilized binder composition as defined in claim 1.

7. A paving mix according to claim 6 in which said binder composition comprises 60 to 70%, by weight, of said bituminous material and 30 to 40%, by weight, of said sulphur based on the weight of said composition.

8. A paving mix according to claim 7 in which said polymer has the formula

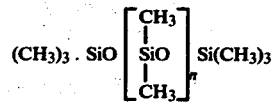

where n ranges from 0 to 2000 and is selected such that the polymer has a viscosity of about 300 to about 12,500 centistokes at 25° C.

9. A paving mix according to claim 8 wherein said bituminous material is asphalt and said polymer is present in a stabilizing amount of about 0.001%, by weight, based on the weight of asphalt.

10. A paved surface formed from a paving mix according to claim 7.

11. In an improved method for preparing a stabilized binder composition for mineral aggregates in the manufacture of paving mixtures which comprises mixing together at an elevated temperature bituminous material and 20 to 50%, by weight, of molten sulphur based on the weight of the composition the improvement which comprises adding an emulsion stabilizing amount of a liquid organosiloxane polymer not exceeding 0.1%, by weight, based on the weight of said bituminous material of, to form an emulsion having a continuous phase of bituminous material and a dispersed phase of molten sulphur.

12. A method according to claim 11, wherein said bituminous material is in an amount of 60 to 70%, by weight, and said sulphur is in an amount of 30 to 40%, by weight.

13. A method according to claim 12 in which said polymer has the formula

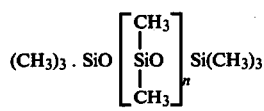

where n ranges from 0 to 2000 and is selected such that the polymer has a viscosity of about 300 to about 12,500 centistokes at 25° C.

14. A method according to claim 12 wherein said mixing is at a temperature of from about 130° C. to about 150° C.

15. A method according to claim 12 including maintaining the resulting emulsion in a thermostatically controlled storage vessel at a temperature of 125° C. to 145° C. under gentle agitation.

16. A method according to claim 14 wherein the ingredients of the composition are passed through an in-line static mixer having a plurality of baffles adapted to produce flow division and radial mixing of the composition, said bituminous material and sulphur being combined at a point immediately prior to said mixer.

17. A method according to claim 16 wherein said ingredients flow through said static mixer with a fluid stream velocity in the range of 1 to 25 ft./sec.

18. In an improved method for preparing a bituminous paving mixture comprising mixing at an elevated temperature from about 85 to 95%, by weight, of a mineral aggregate, a liquid bituminous material, and liquid sulphur, in a total of 5% to 15%, by weight; said sulphur being present in an amount of 20% to 50%, based on the total weight of the bituminous material and the sulphur; the improvement which comprises adding an amount of an organosiloxane polymer not exceeding 0.1%, by weight, based on the weight of bituminous material.

19. A method according to claim 18 wherein said mixing is in a pugmill and said bituminous material containing said polymer and said sulphur are introduced simultaneously into the pugmill containing the mineral aggregate.

20. A method according to claim 19 wherein said bituminous material and said sulphur are introduced into a static mixer having a plurality of baffles adapted to produce flow division and radial mixing, at a point immediately prior to said pugmill.

21. A method according to claim 18 wherein said bituminous material is present in an amount of 60 to 70%, and said sulphur is present in an amount of 30 to 40%, by weight, based on the total weight of the bituminous material and the sulphur.

22. A composition according to claim 1, wherein said emulsion comprises 60 to 70%, by weight, of said bituminous material and 30 to 40%, by weight, of said sulphur, based on the weight of said composition.

23. A composition according to claim 22, wherein said organosiloxane polymer is present in an emulsion stabilizing amount of about 0.001%, by weight, based on the weight of bituminous material.

* * * * *